US012399359B1

(12) United States Patent
Wang

(10) Patent No.: US 12,399,359 B1
(45) Date of Patent: Aug. 26, 2025

(54) SIGHT

(71) Applicant: Peng Wang, Yueyang (CN)

(72) Inventor: Peng Wang, Yueyang (CN)

( * ) Notice: Subject to any disclaimer, the term of this patent is extended or adjusted under 35 U.S.C. 154(b) by 0 days.

(21) Appl. No.: 18/588,596

(22) Filed: Feb. 27, 2024

(51) Int. Cl.
*G02B 23/16* (2006.01)
(52) U.S. Cl.
CPC .................................. *G02B 23/16* (2013.01)
(58) Field of Classification Search
CPC ...................................................... G02B 23/16
USPC ................................................................ 359/818
See application file for complete search history.

(56) References Cited

U.S. PATENT DOCUMENTS

2002/0067408 A1* 6/2002 Adair ..................... H04N 23/66
348/66
2008/0013175 A1* 1/2008 Laganas ............... G03B 17/561
359/503

* cited by examiner

*Primary Examiner* — Wyatt A Stoffa
*Assistant Examiner* — Mitchell T Oestreich

(57) ABSTRACT

The present disclosure provides a sight. The sight includes a main body and an objective lens piece. The main body includes a connection end. A first electric connection assembly is arranged on an end surface of the connection end of the main body. A first clamping member is arranged around the first electric connection assembly. A second electric connection assembly is arranged on one end surface of the objective lens piece. A second clamping member is arranged around the second electric connection assembly. The second clamping member is clamped into the first clamping member to make the objective lens piece detachably connected to the main body. When the second clamping member is clamped into the first clamping member, the second electric connection assembly is abutted to the first electric connection assembly to make the objective lens piece electrically connected to the main body.

12 Claims, 17 Drawing Sheets

SIGHT

TECHNICAL FIELD

The present disclosure relates to a sight, and in particular, to a night vision sight, a digital sight, and a dual-lens sight, applied to the field of sighting telescopes.

BACKGROUND

Sights, also referred to as optical sights, are mainly classified into the following three categories: telescope sights, collimating optical sights, and reflex sights. The telescopic sights and the reflex sights are the most popular. The above two types of sights are mainly used in the day, so they are collectively referred to as day scopes/sights. In addition, there is a night scope/sight for night aiming. The night scope/sight is formed by adding a night vision device to the above two types of sights. According to the types of night vision devices, the sights can be classified into low light level sights and infrared sights (which can be further classified into active infrared sights and thermal imaging infrared sights).

The sights are applied to widespread scenarios, including military, police, shooting sports, hunting, self-defense, training, and other fields. The sights have quick and accurate aiming capabilities to help users better complete tasks in various situations, so that the sights are increasingly popular. However, as the sights are high-precision instruments having strict processing requirements, the sights are relatively expensive. An objective lens in the sight plays an important adjustment role, and is configured to reflect a target at a distance onto a reticle through optical convergence and imaging and make the target overlap a sight line on the reticle, so as to form correct aiming. That is, the objective lens is a very important part in the overall structure of the sight, and the high price is also closely related to the objective lens. However, according to the sight currently sold on the market, the objective lens is integrated with a sight body, and the objective lens and the sight body are inseparable. Therefore, if a focal length of the objective lens is not enough or if a user intends to use various focal lengths, the user can only purchase a new sight to meet the need. Therefore, the integrated arrangement of the objective lens and the sight body is not convenient for the user, which brings troubles. Especially, as the increasingly popular night vision sight, digital sight, and dual-lens sight are expensive, the user cannot use various focal lengths.

SUMMARY

According to the above, in the prior art, in a sight currently sold on the market, an objective lens is integrated with a sight body, and the objective lens and the sight body are inseparable. Therefore, if a focal length of the objective lens is not enough or if a user intends to use various focal lengths, the user can only purchase a new sight to meet the need. This causes the problem of inconvenience in use. The present disclosure provides the sight. The objective lens piece of the sight is separably connected to the main body of the sight through the first clamping member and the second clamping member. The objective lens piece of the sight is electrically connected to the main body of the sight through the first electric connection assembly and the second electric connection assembly, so that when the user intends to use various focal lengths of the sight, the user can directly replace the objective lens piece, without purchasing an entire sight. This brings convenience for the user.

The technical solution adopted by the present disclosure to solve the technical problem is as follows:

A sight, wherein the sight includes:
a main body, wherein the main body includes a connection end; a first electric connection assembly is arranged on an end surface of the connection end of the main body; a first clamping member is arranged around the first electric connection assembly; and an objective lens piece, wherein a second electric connection assembly is arranged on one end surface of the objective lens piece; a second clamping member is arranged around the second electric connection assembly; the second clamping member is clamped into the first clamping member to make the objective lens piece detachably connected to the main body; and when the second clamping member is clamped into the first clamping member, the second electric connection assembly is abutted to the first electric connection assembly to make the objective lens piece electrically connected to the main body.

Further, the end surface of the connection end of the main body is provided with a first groove; the first electric connection assembly and the first clamping member are both arranged in the first groove; an end surface of one end of the objective lens piece connected to the main body is provided with a second groove; the second clamping member and the second electric connection assembly are both arranged in the second groove; and when the objective lens piece is mounted on the main body, the second groove wraps around the first groove or the first groove wraps around the second groove.

Further, the first clamping member includes a clamping port; the clamping port is arranged on a side wall of the first groove; the second clamping member includes a clamping block and a hollow mounting column; two ends of the mounting column are communicated to each other; the mounting column is arranged in the second groove; the second electric connection assembly is arranged in a through hole of the mounting column; the clamping block is arranged around an outer side of the mounting column; a gap exists between an end socket of the clamping block and a side wall of the second groove; the gap accommodates the side wall of the first groove; when the objective lens piece is mounted on the main body, the side wall of the first groove is mounted in the gap, and the second groove wraps around the first groove; or the first clamping member includes a clamping block and a hollow mounting column; two ends of the mounting column are communicated to each other; the mounting column is arranged in the first groove; the clamping block is arranged around an outer side of the mounting column; a gap exists between an end socket of the clamping block and the side wall of the first groove; the gap accommodates a side wall of the second groove; and when the objective lens piece is mounted on the main body, the side wall of the second groove is mounted in the gap, and the first groove wraps around the second groove.

Further, the clamping port includes an insertion opening and a sliding rail; the insertion opening is communicated to the sliding rail; the clamping block is inserted along the insertion opening into the sliding rail and slides in the sliding rail; and the clamping block is abutted to a side wall of the sliding rail.

Further, the sight further includes a locking member; the locking member is slidably arranged on the main body; one end of the locking member is located in the first groove; the second groove is internally provided with a locking hole; the locking member has a locked position and an unlocked position; when the locking member is in the locked position, the end of the locking member located in the first groove is inserted into the locking hole; and when the locking member is in the unlocked position, the end of the locking member located in the first groove is separated from the locking hole.

Further, the locking member includes an insertion part, a sliding part, and an elastic member; a sliding space is arranged in the main body; the sliding part slides in the sliding space; the insertion part is arranged at one end of the sliding part and is located in the first groove; the elastic member is abutted to the other end of the sliding part; and when the objective lens piece is rotated to a mounting position, the elastic member pushes the sliding part to insert the insertion part into the locking hole.

Further, a surface of the main body is provided with a sliding slot; the sliding slot is communicated to the sliding space; a surface of the sliding part is convexly provided with a push part; and the push part is threaded out of the sliding slot.

Further, the push part is provided with an inclined friction surface, and one side of the friction surface close to the insertion part is lower than one side close to the elastic member.

Further, the sight is a digital sight; the digital sight further includes a liquid crystal display device and a first Complementary Metal-Oxide-Semiconductor Transistor (CMOS) image sensing device; the liquid crystal display device and the first CMOS image sensing device are arranged in the main body; and the liquid crystal display device and the first CMOS image sensing device are electrically connected.

Further, the sight is a night vision sight; the night vision sight further includes a first night vision device; and the first night vision device is arranged in the main body.

Further, the sight is a dual-lens sight; the main body of the dual-lens sight includes two connection ends; the two connection ends are arranged side by side; the dual-lens sight includes a second CMOS image sensing device and a second night vision device; the second night vision device is arranged in one of the connection ends; and the second CMOS image sensing device is arranged in the other connection end.

The present disclosure has the following beneficial effects. The present disclosure provides a sight. The objective lens piece of the sight is separably connected to the main body of the sight through the first clamping member and the second clamping member. The objective lens piece of the sight is electrically connected to the main body of the sight through the first electric connection assembly and the second electric connection assembly, so that when the user intends to use various focal lengths of the sight, the user can directly replace the objective lens piece, without purchasing an entire sight. This brings convenience for the user.

DETAILED DESCRIPTION OF THE EMBODIMENTS

In order to make the aim, technical scheme and advantages of the invention clearer, the following will be combined with the accompanying drawings of embodiments of the present disclosure, The technical scheme in the embodiment of the invention is clearly and completely described. It should be understood that the specific embodiments described herein are intended only to explain the present disclosure and are not intended to define the present disclosure.

Figure 1:
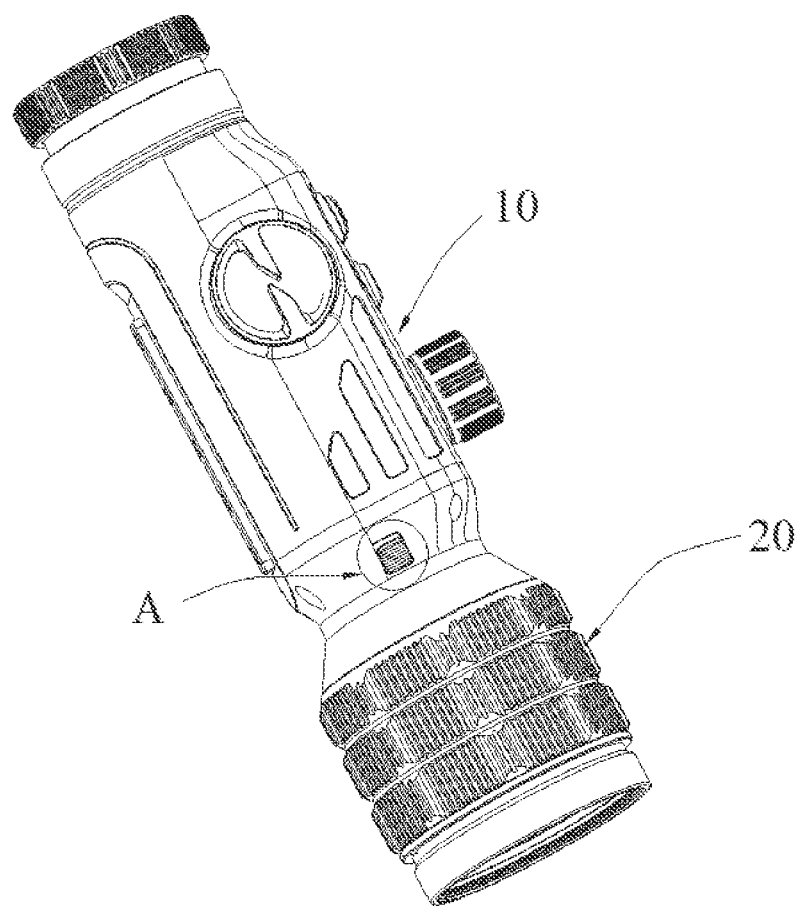
FIG. 1 is a three-dimensional diagram of a digital sight provided according to the present disclosure.
Figure 2:
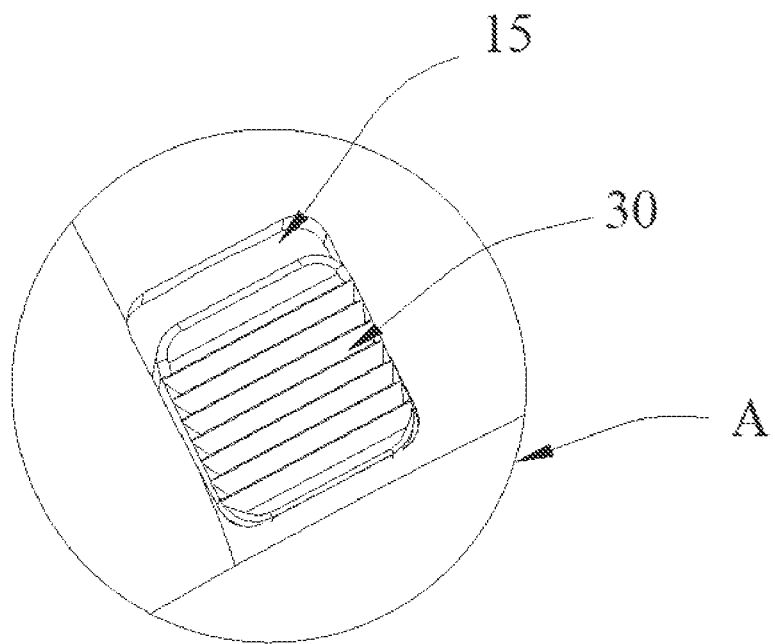
FIG. 2 is an enlarged view of A in FIG. 1 provided according to the present disclosure.
Figure 3:
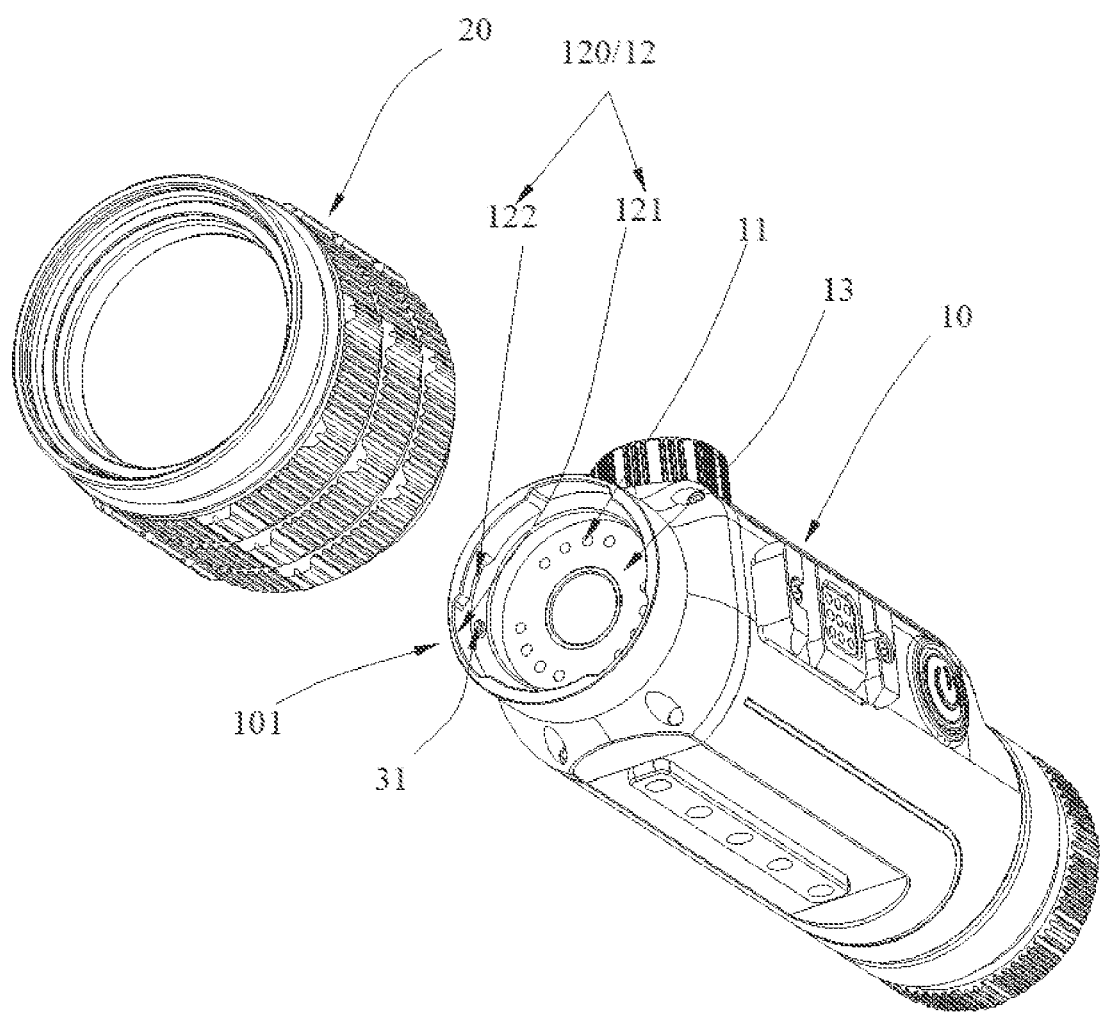
FIG. 3 is an exploded diagram of a digital sight provided according to the present disclosure.
Figure 4:
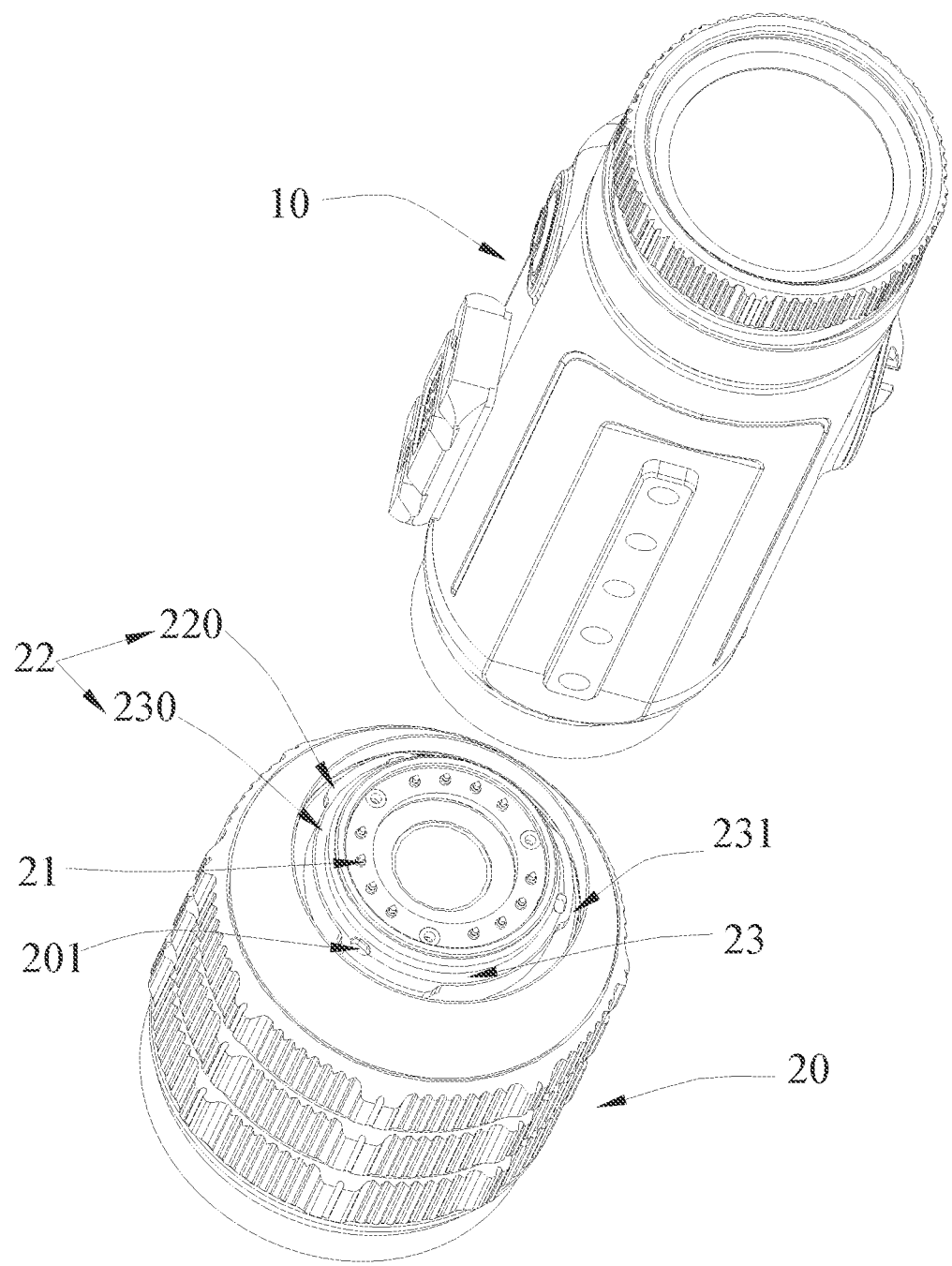
FIG. 4 is an exploded diagram of a digital sight provided according to the present disclosure.
Figure 5:
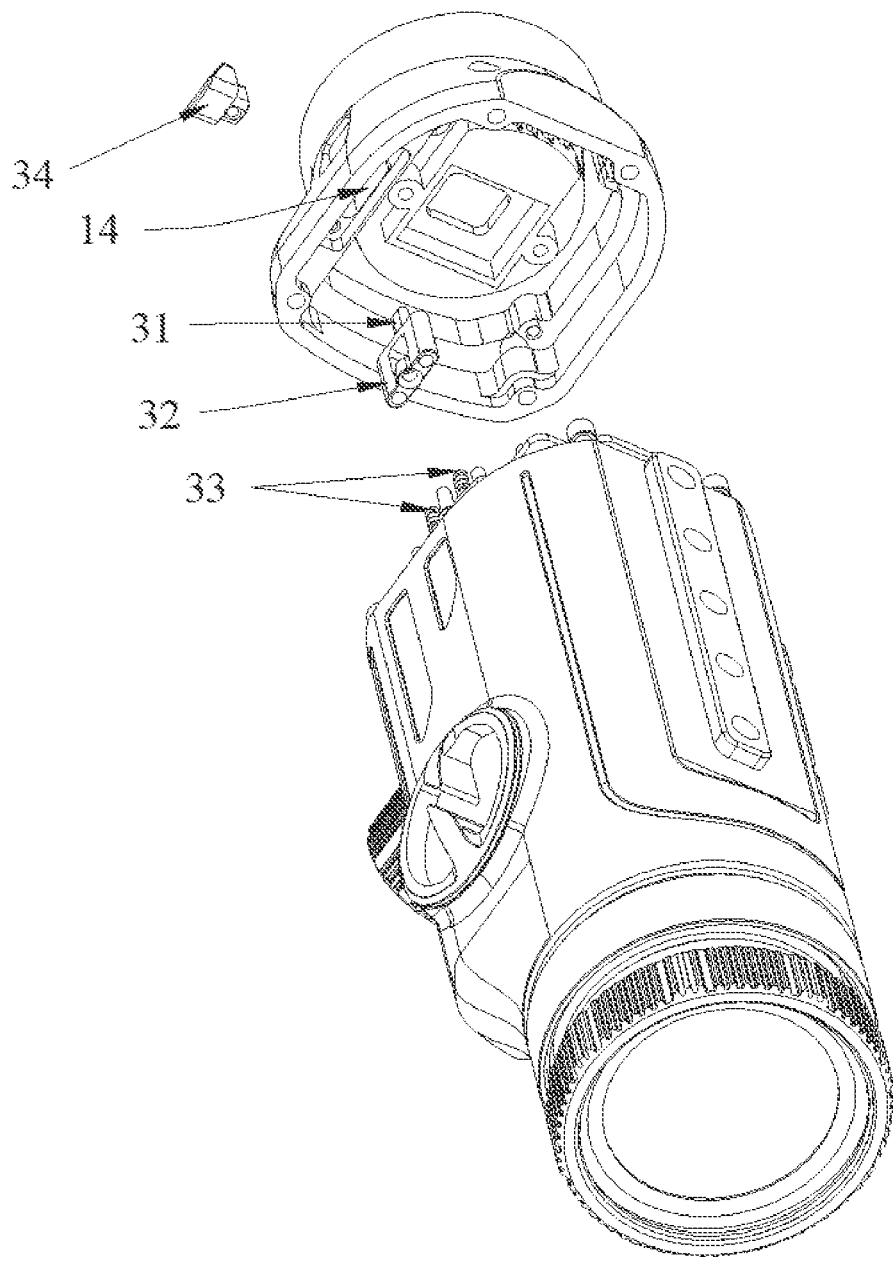
FIG. 5 is a schematic diagram of an exploded structure of a main body of a digital sight provided according to the present disclosure.
Figure 6:
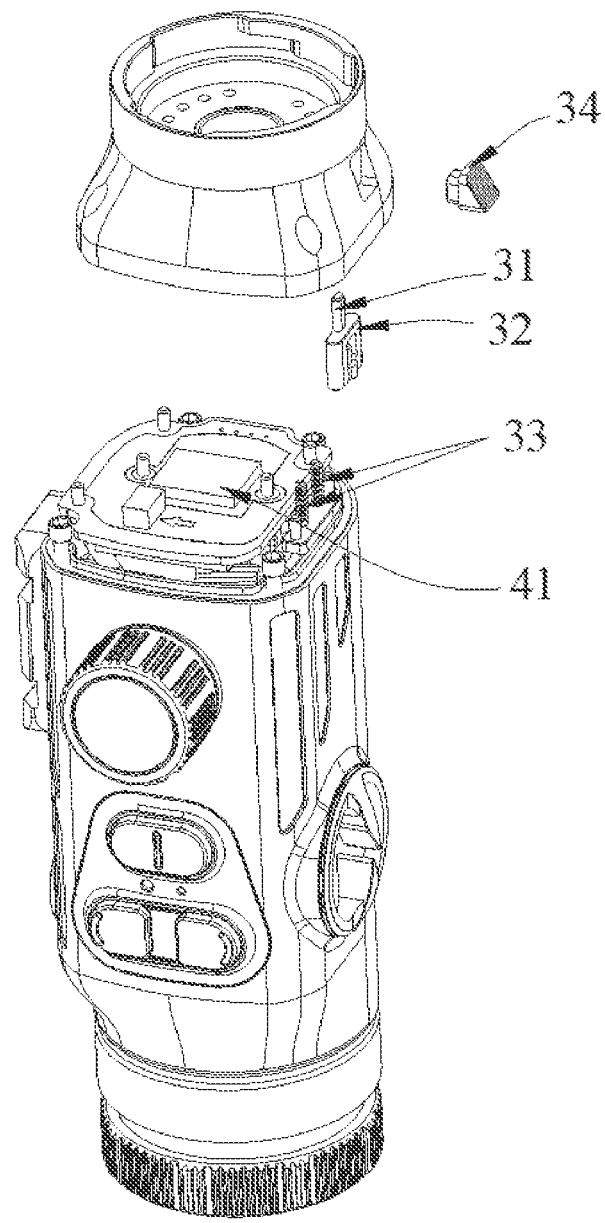
FIG. 6 is an exploded diagram of the main body of FIG. 5 provided according to the present disclosure in another viewing angle.
Figure 7:
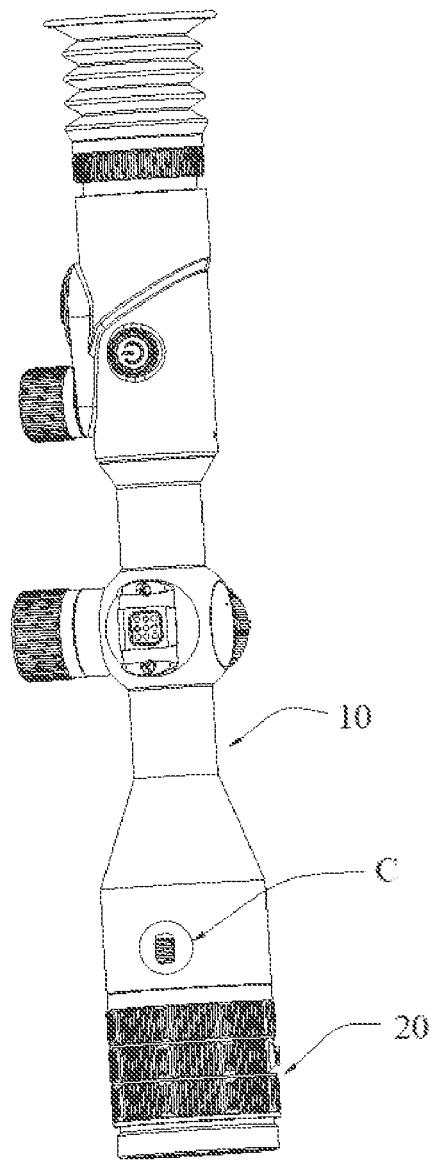
FIG. 7 is a three-dimensional diagram of a night vision sight provided according to the present disclosure.
Figure 8:
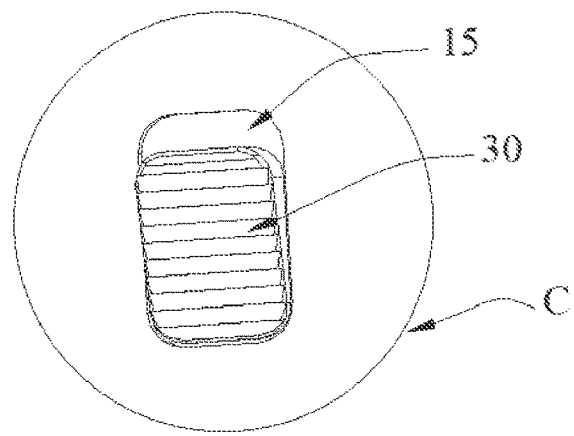
FIG. 8 is an enlarged view of B in FIG. 7 provided according to the present disclosure.
Figure 9:
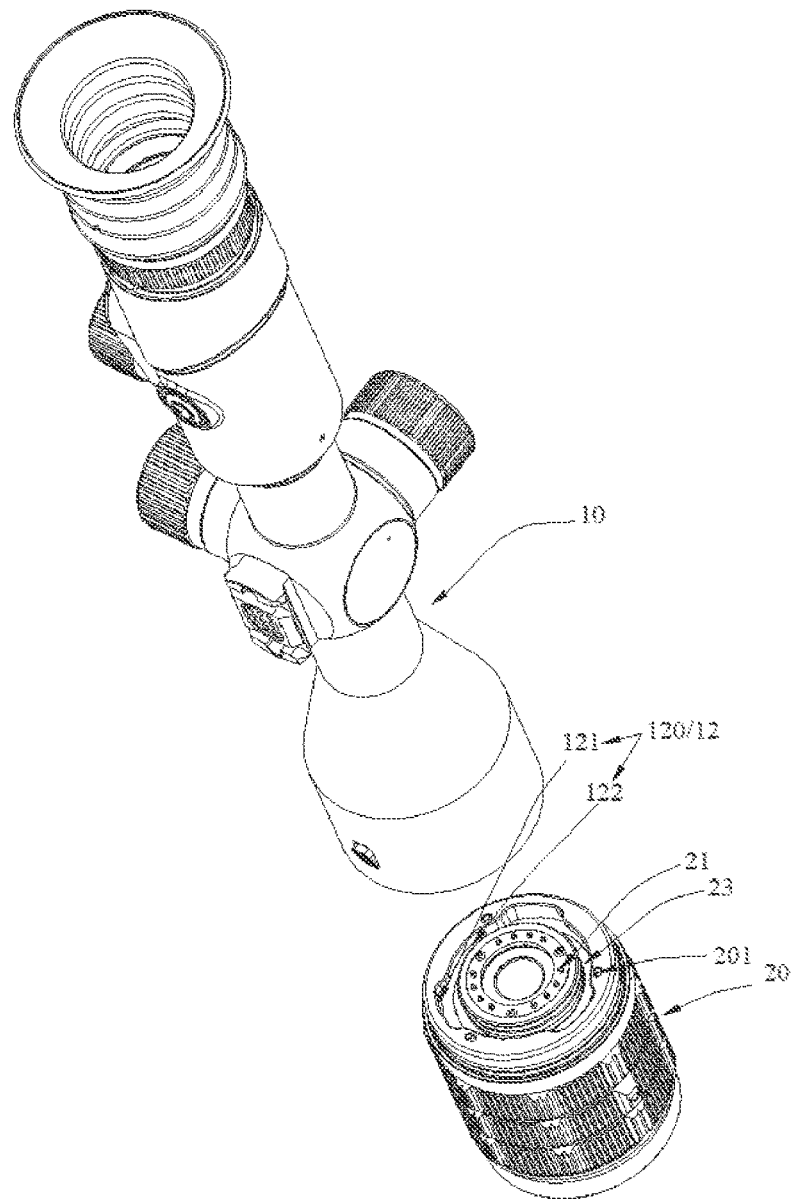
FIG. 9 is an exploded diagram of a night vision sight provided according to the present disclosure.
Figure 10:
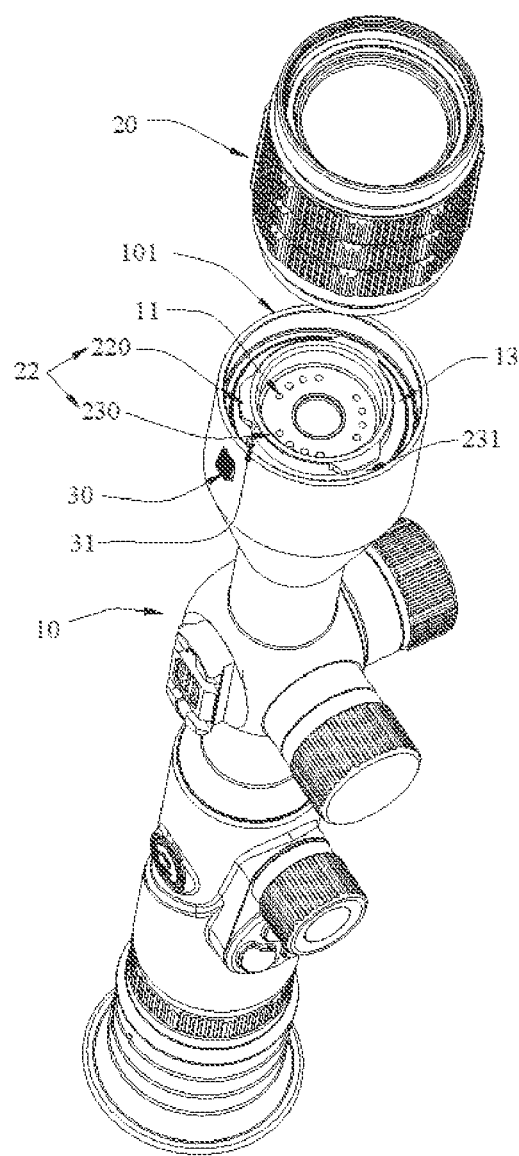
FIG. 10 is an exploded diagram of a night vision sight provided according to the present disclosure.
Figure 11:
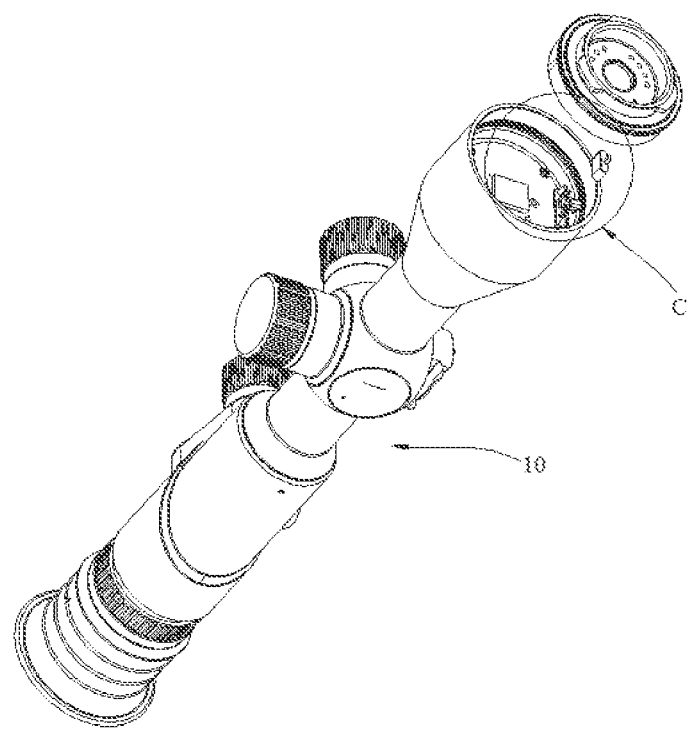
FIG. 11 is a schematic diagram of an exploded structure of a main body of a night vision sight provided according to the present disclosure.
Figure 12:
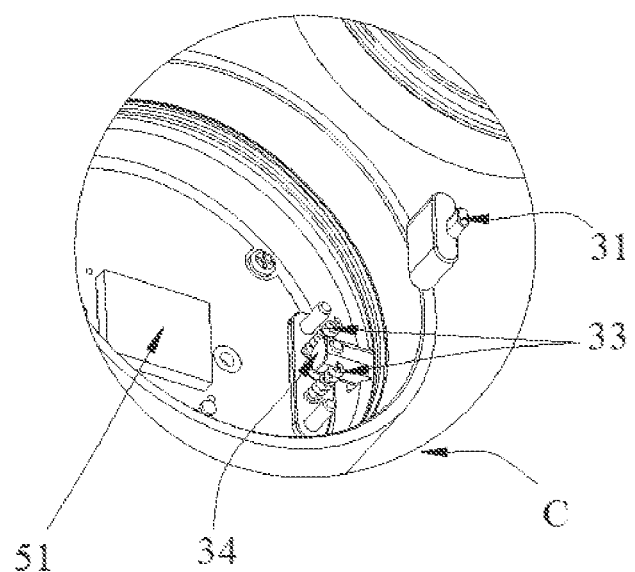
FIG. 12 is an enlarged view of C in FIG. 11 provided according to the present disclosure.
Figure 13:
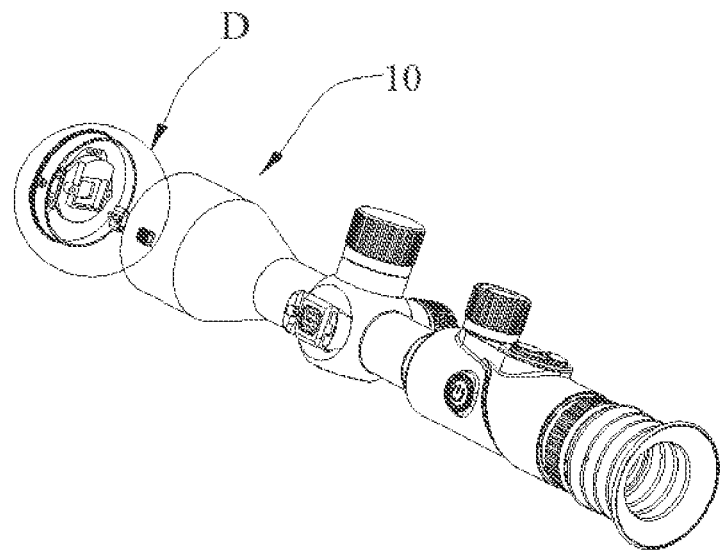
FIG. 13 is an exploded diagram of the main body of FIG. 11 provided according to the present disclosure in another viewing angle.
Figure 14:
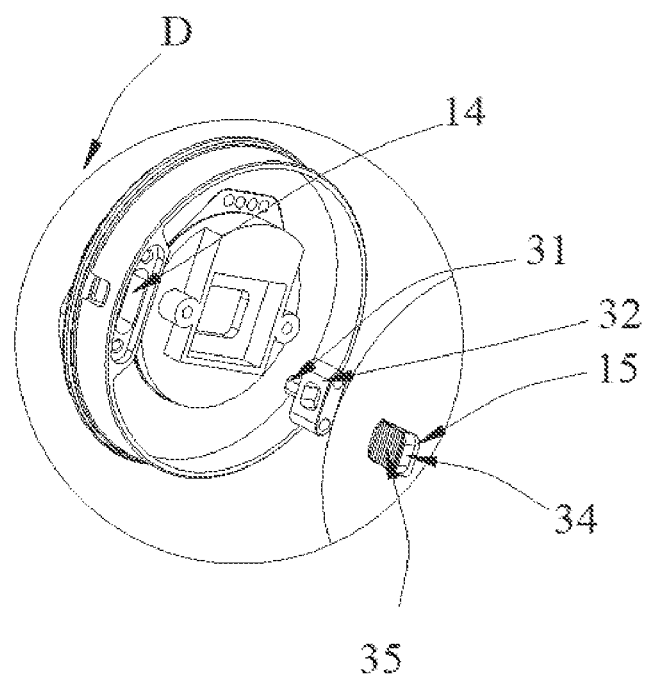
FIG. 14 is an enlarged view of D in FIG. 13 provided according to the present disclosure.
Figure 15:
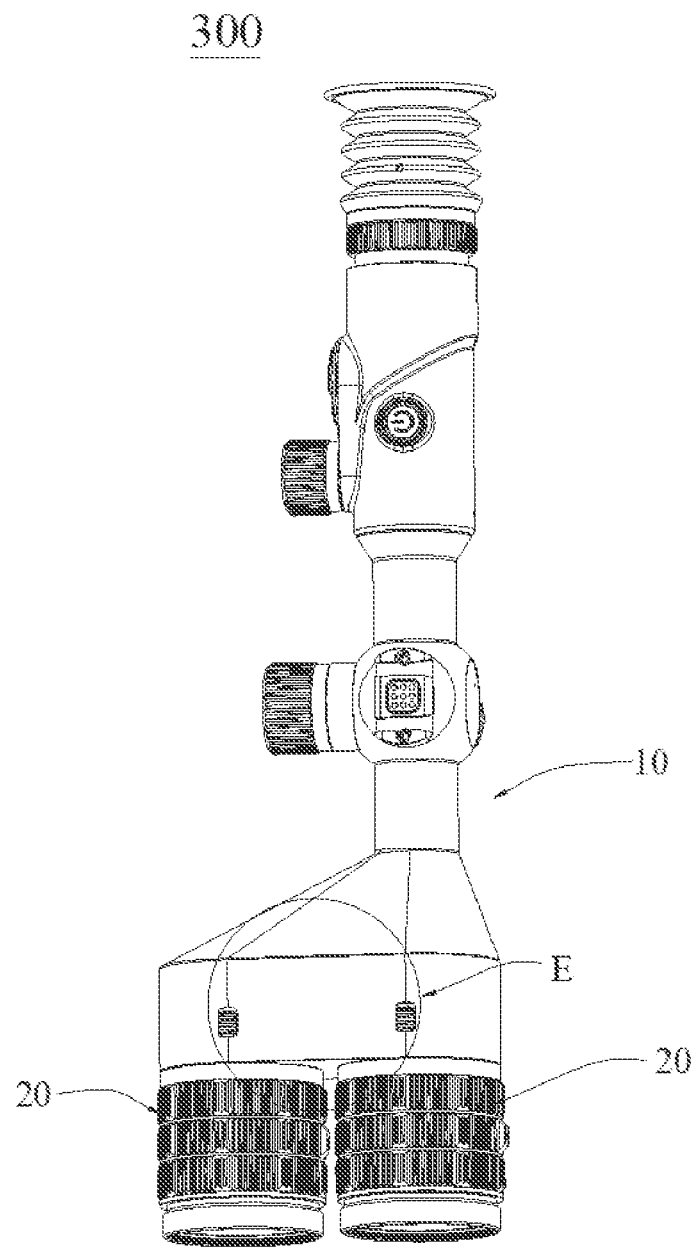
FIG. 15 is a three-dimensional diagram of a dual-lens sight provided according to the present disclosure.
Figure 16:
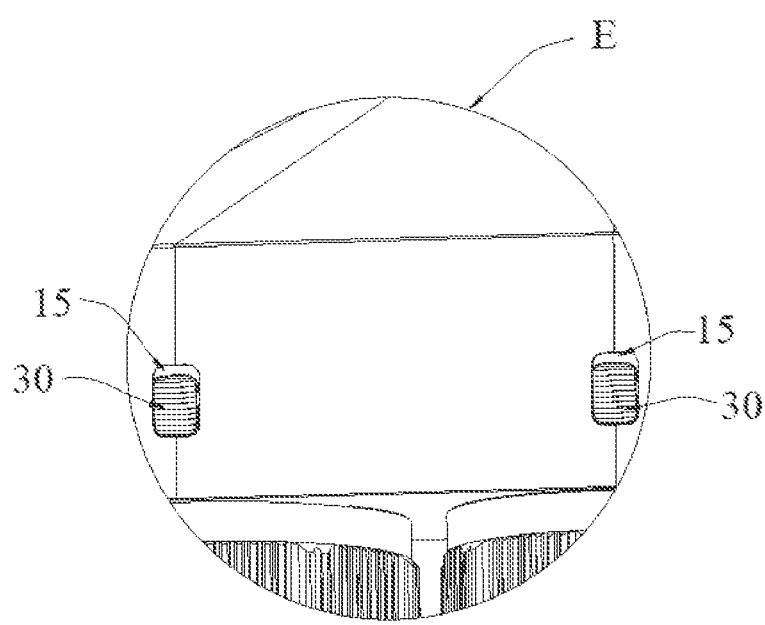
FIG. 16 is an enlarged view of E in FIG. 15 provided according to the present disclosure.
Figure 17:
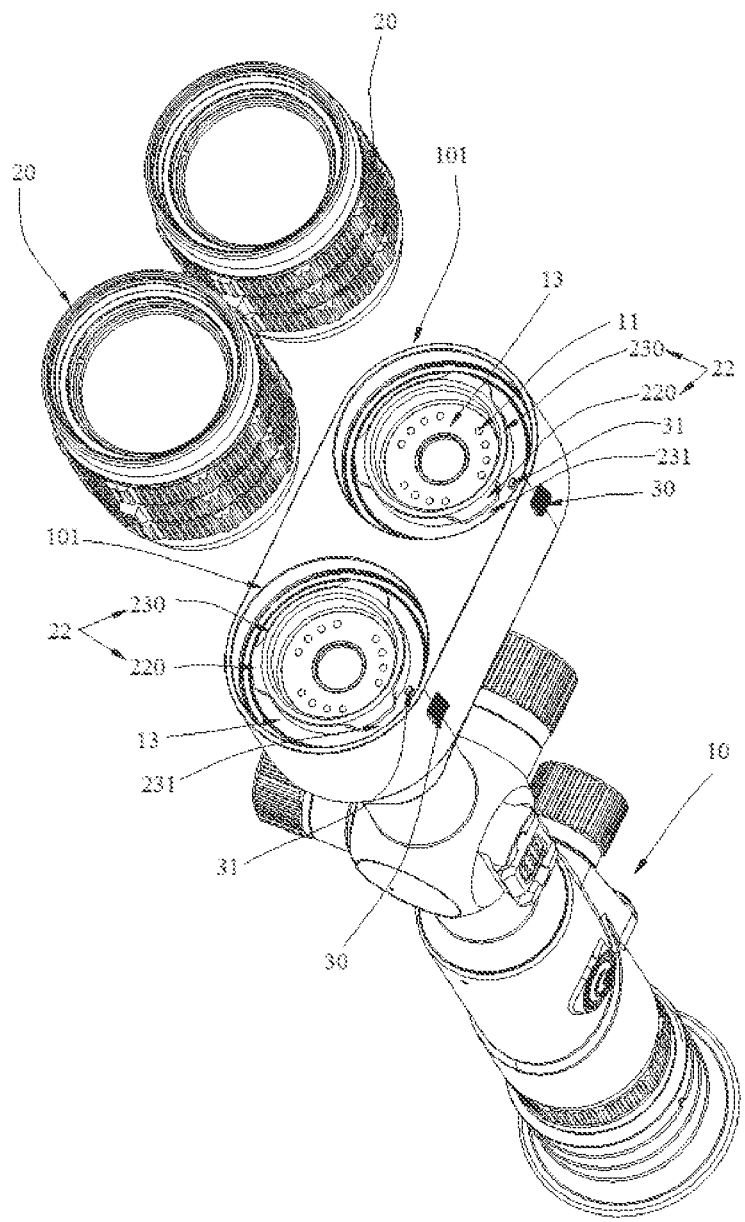
FIG. 17 is an exploded diagram of a dual-lens sight provided according to the present disclosure.
Figure 18:
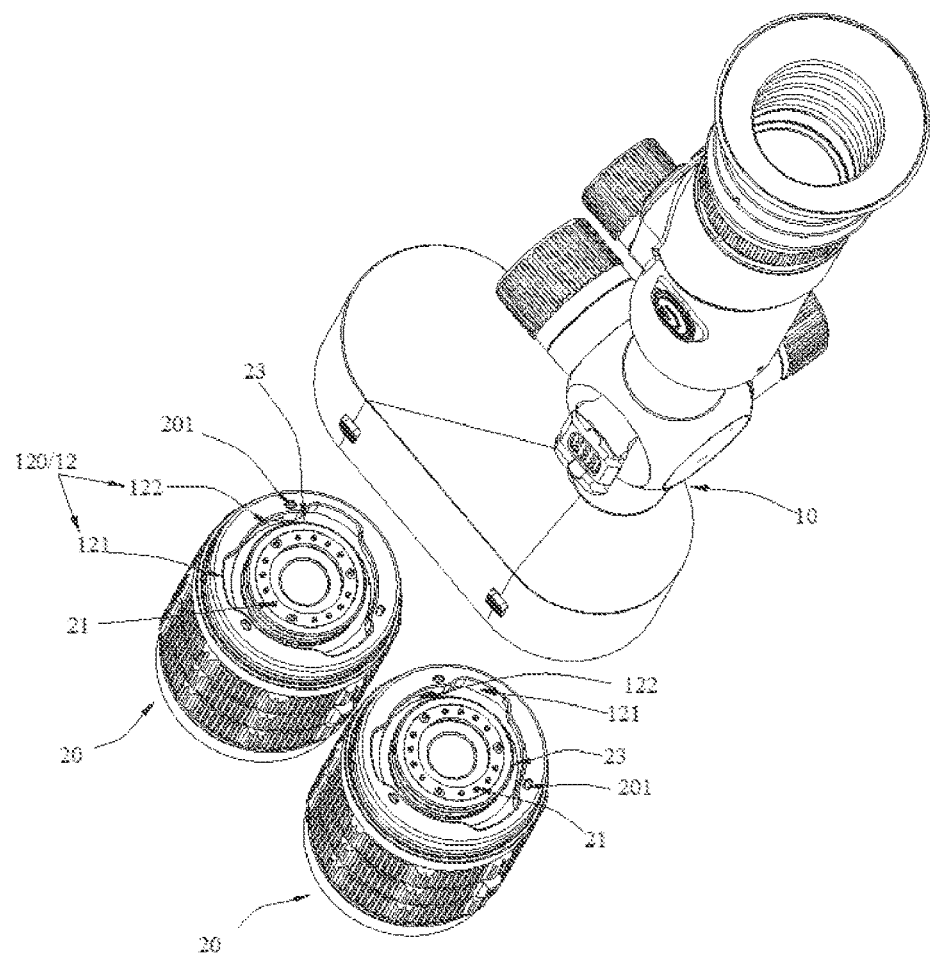
FIG. 18 is an exploded diagram of a dual-lens sight provided according to the present disclosure.
Figure 19:
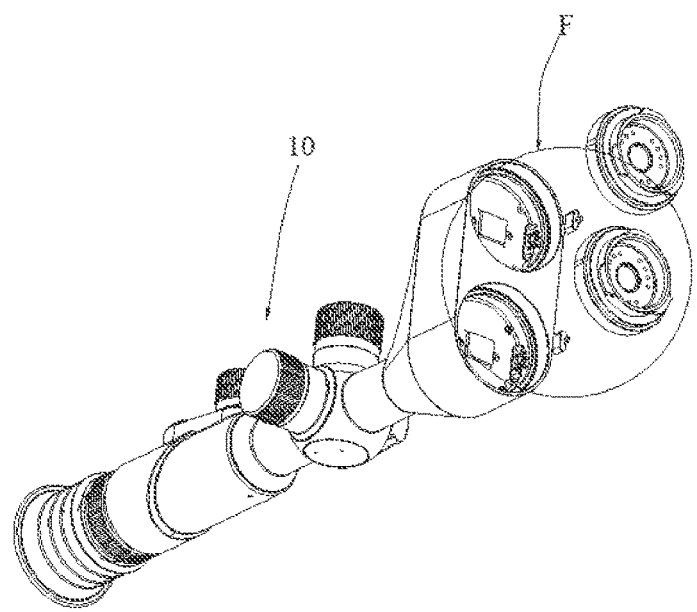
FIG. 19 is a schematic diagram of an exploded structure of a main body of a dual-lens sight provided according to the present disclosure.
Figure 20:
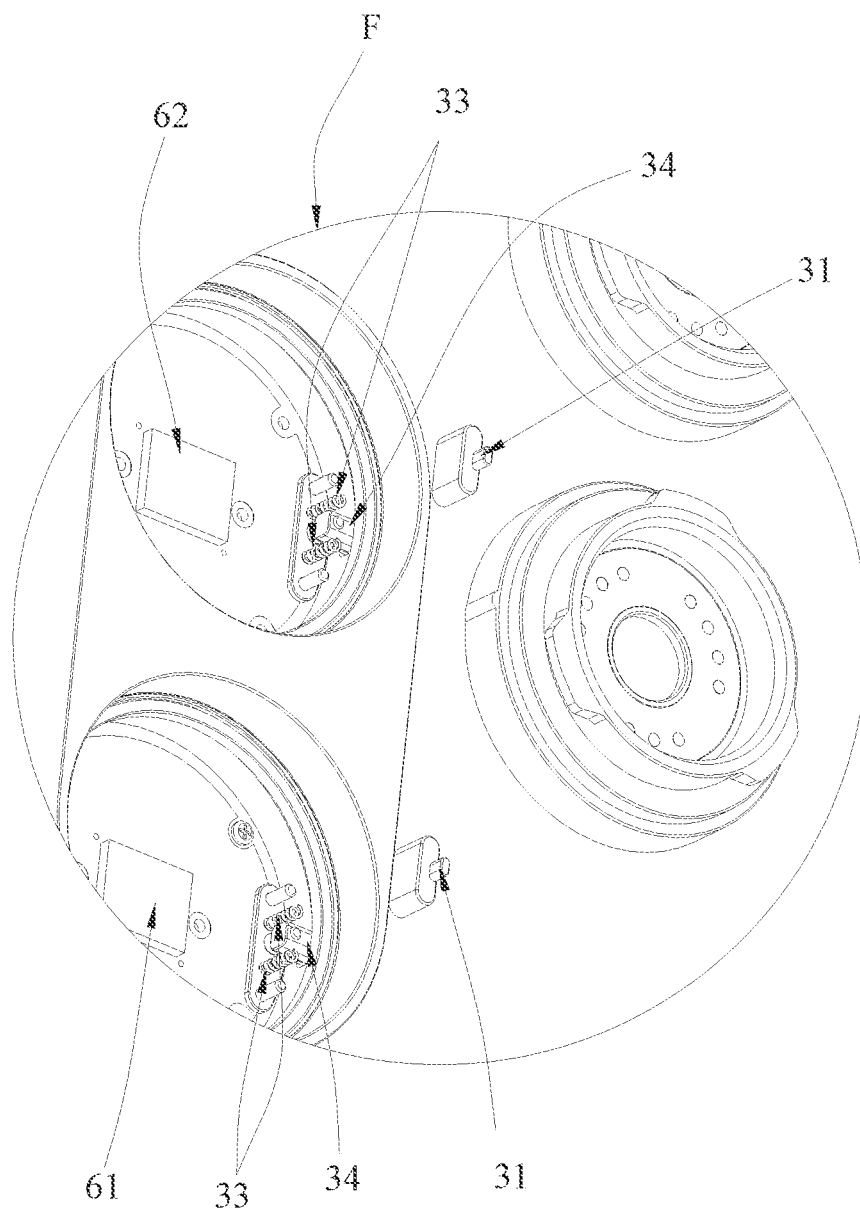
FIG. 20 is an enlarged view of F in FIG. 19 provided according to the present disclosure.
Figure 21:
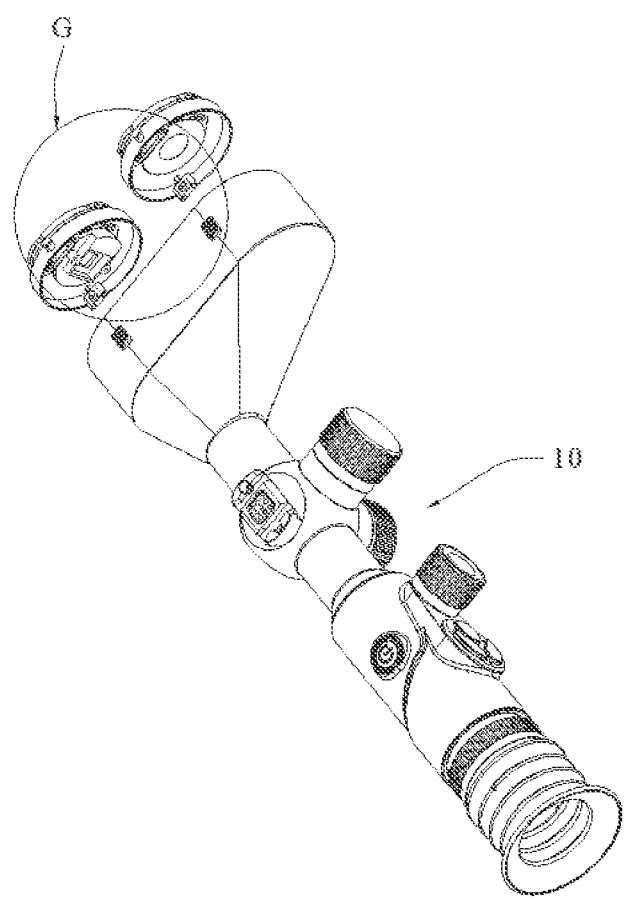
FIG. 21 is an exploded diagram of the main body of the dual-lens sight provided according to the present disclosure in another viewing angle.
Figure 22:
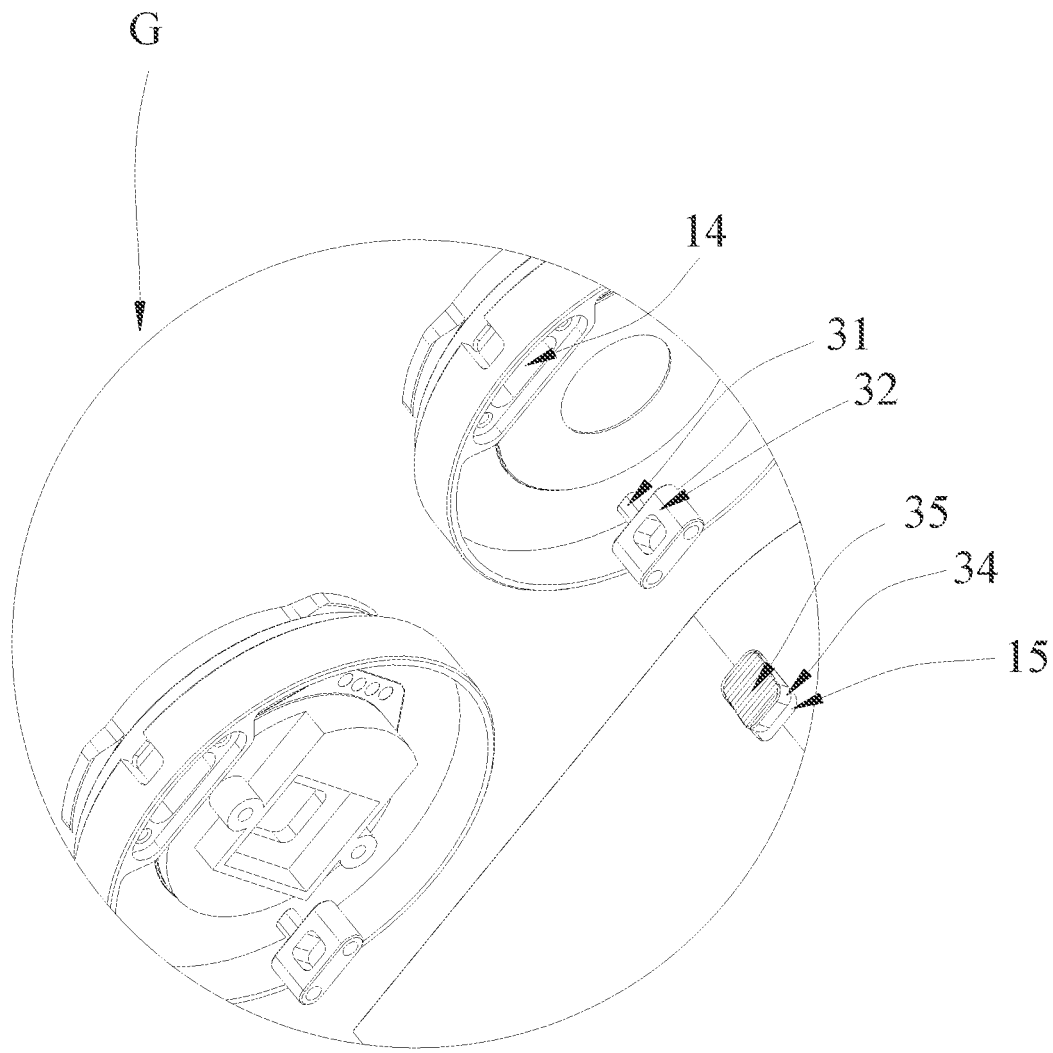
FIG. 22 is an enlarged view of G in FIG. 21 provided according to the present disclosure.

Referring to FIG. 1 to FIG. 22, the present disclosure provides a sight. The sight includes a main body 10 and an objective lens piece 20.

The main body 10 includes a connection end 101; a first electric connection assembly 11 is arranged on an end surface of the connection end 101 of the main body 10; and a first clamping member 12 is arranged around the first electric connection assembly 11.

A second electric connection assembly 21 is arranged on one end surface of the objective lens piece 20; a second clamping member 22 is arranged around the second electric connection assembly 21; the second clamping member 22 can be clamped into the first clamping member 12 to make the objective lens piece 20 detachably connected to the main body 10; and when the second clamping member 22 is clamped into the first clamping member 12, the second electric connection assembly 21 is abutted to the first electric connection assembly 11 to make the objective lens piece 20 electrically connected to the main body 10. That is, the objective lens piece of the sight is separably connected to the main body of the sight through the first clamping member and the second clamping member. The objective lens piece of the sight is electrically connected to the main body of the sight through the first electric connection assembly and the second electric connection assembly, so that when the user intends to use various focal lengths of the sight, the user can directly replace the objective lens piece, without purchasing an entire sight. This brings convenience for the user.

The sight in this embodiment can be a digital sight 100, a night vision sight 200, and a dual-lens sight 300. The main bodies and objective lenses of the three types of sights are detachably connected through the first electric connection assembly and the second electric connection assembly, and are electrically connected through the first electric connection assembly and the second electric connection assembly. It should be noted that the lenses of the digital sight 100, the night vision sight 200, and the dual-lens sight 300 are not interchangeable, but different sights have their own objective lenses, because materials and design structures of the objective lenses of these sights are different. Therefore, the objective lenses cannot be interchangeable.

FIG. 1 to FIG. 6 show schematic detachably structural diagrams between the objective lens and the main body of the digital sight 100. The digital sight 100 further includes a liquid crystal display device and a first CMOS image sensing device 41. The liquid crystal display device and the first CMOS image sensing device 41 are arranged in the main body, and the liquid crystal display device is electrically connected to the first CMOS image sensing device 41. The liquid crystal display device is not shown in the figure, but a liquid crystal display technology is the prior art, which will not be elaborated here.

The above night vision sight 200 includes a low light level sight, an active infrared sight, and a thermal imaging sight. A first night vision device 51 is arranged in the main body of each of the three types of sights. However, the first night vision devices 51 have different structures depending on different presentation effects. The low light level sight does not use infrared rays, but enhances light emitted by a target under weak light onto a screen for imaging through an enhancer. People can see this image with the naked eye. That is, the low light level sight adopts a second-generation microchannel plate image enhancer, which can improve the imaging quality, expand the spectral bandwidth, and reduce the mass. The active infrared sight illuminates a target using infrared rays, and the infrared rays are reflected by the target for imaging. The thermal imaging sight is used for performing thermal imaging on the sight. In this embodiment, the night vision sight 200 in this embodiment is a thermal imaging sight structurally shown in FIG. 7 to FIG. 14. The other two types are not shown here, the detachable structures of which between the objective lenses and the main bodies are consistent with the detachable structure shown in FIG. 7 to FIG. 14.

FIG. 15 to FIG. 22 show diagrams of the above dual-lens sight 300. The main body 10 of the dual-lens sight 300 includes two connection ends 101. The two connection ends 101 are arranged side by side. The dual-lens sight 300 further includes a second CMOS image sensing device 61 and a second night vision device 62. The second night vision device 62 is arranged in one connection end 101, and the second CMOS image sensing device 61 is arranged in the other connection end 101. That is, the dual-lens sight 300 can be provided with two objective lens pieces. The two objective lens pieces can be detachably connected to the main body. One lens piece of the dual-lens sight is for night vision displaying, and the other lens piece is for white light displaying, so as to meet a need of a user for using two lenses.

In this embodiment, the end surface of the connection end of the main body 10 is provided with a first groove 13; the first electric connection assembly 11 and the first clamping member 12 are both arranged in the first groove 13; an end surface of one end of the objective lens piece 20 connected to the main body 10 is provided with a second groove 23; the second clamping member 22 and the second electric connection assembly 21 are both arranged in the second groove 23; and when the objective lens piece 20 is mounted on the main body 10, the second groove 23 wraps around the first groove 13 or the first groove 13 wraps around the second groove 23. The objective lens piece 20 and the main body 10 are both provided with the grooves, so that the objective lens piece and the main body are connected more tightly, and the stability of mounting of the objective lens piece is higher. When the user shakes at any time, it is not easy for the objective lens piece to be separated from the main body; and the objective lens piece is protected, which avoids loss of the user.

In this embodiment, the first clamping member 12 includes a clamping port 120; the clamping port 120 is arranged on a side wall of the first groove 13; the second clamping member 22 includes a clamping block 220 and a mounting column 230; two ends of the mounting column 230 are communicated to each other; the mounting column 230 is arranged in the second groove 23; the second electric connection assembly 21 is arranged in a through hole of the mounting column 230; the clamping block 220 is arranged around an outer side of the mounting column 230; a gap 231 exists between an end socket of the clamping block 220 and a side wall of the second groove 23; the gap 231 can accommodate the side wall of the first groove 13; and when the objective lens piece 20 is mounted on the main body 10, the side wall of the first groove 13 is mounted in the gap 231, and the second groove 23 wraps around the first groove 13. Or the first clamping member 12 includes a clamping block 220 and a mounting column 230; two ends of the mounting column 230 are communicated to each other; the mounting column 230 is arranged in the first groove 13; the clamping block 220 is arranged around an outer side of the mounting column 230; a gap 231 exists between an end socket of the clamping block 220 and the side wall of the first groove 13; the gap 231 can accommodate a side wall of the second groove 23; and when the objective lens piece 20 is mounted on the main body 10, the side wall of the second groove 23 is mounted in the gap 231, and the first groove 13 wraps around the second groove 23. The above structure further improves the stability of mounting of the objective lens piece.

In this embodiment, the clamping port 120 includes an insertion opening 121 and a sliding rail 122; the insertion opening 121 is communicated to the sliding rail 122; the clamping block 220 is inserted along the insertion opening 121 into the sliding rail 122 and can slide in the sliding rail 122; and the clamping block 220 is abutted to a side wall of the sliding rail 122. By means of the arrangement of the above structure, during mounting of the objective lens piece, the clamping block is inserted along the insertion opening into the sliding rail, and the objective lens piece is rotated to make the clamping block slide in the sliding rail. In this case, the clamping block is abutted to the inner wall of the sliding rail to prevent the objective lens piece from falling off. This facilitates the mounting by the user.

In this embodiment, the sight further includes a locking member 30; the locking member 30 is slidably arranged on the main body 10; one end of the locking member 30 is located in the first groove 13; the second groove 23 is internally provided with a locking hole 201; the locking member 30 has a locked position and an unlocked position; when the locking member 30 is in the locked position, the end of the locking member 30 located in the first groove 13 is inserted into the locking hole 201; and when the locking member 30 is in the unlocked position, the end of the locking member 30 located in the first groove 13 is separated from the locking hole 201. The objective lens piece is rotated to a mounting position. In this case, the locking member faces the locking hole and is inserted into the locking hole to further fix the objective lens piece, so as to prevent the objective lens piece from being rotated relative to the main body and improve the stability of the product. During removal of the objective lens piece, the locking member is pressed to be separated from the locking hole; the objective lens piece is rotated to make the clamping block face the insertion opening; the clamping block is pulled out along the insertion opening to facilitate the user to remove and replace the objective lens piece, improve the adaptability of the product, and also facilitate the user to maintain and clean the objective lens piece.

In this embodiment, the objective lens piece 20 has an insertion position and a mounting position. When the objective lens piece 20 is in the insertion position, the clamping block can be inserted in or pulled out along the insertion opening. When the objective lens piece 20 is rotated to the mounting position, the clamping block is abutted to the side wall of the sliding rail; and when the locking member 30 is in the locked position, the locking member 30 is inserted into the locking hole 201. By means of the arrangement of the above structure, the objective lens piece can be rotated relative to the main body. When the objective lens piece is rotated to the insertion position, the clamping block faces the insertion opening and can be inserted in or pulled out along the insertion opening. The objective lens piece is rotated. In this case, the convex block slides in the sliding rail and is abutted to the inner wall of the sliding rail. The objective lens piece is rotated to the mounting position, and the locking member is inserted into the locking hole to limit the relative rotation between the objective lens piece and the main body, making it convenient to use. There may be a plurality of convex blocks which are uniformly arranged in the groove. Correspondingly, there should also be a plurality of insertion openings. The number and relative positions of the insertion openings correspond to the number and relative positions of the convex blocks. Preferably, there may be three convex blocks. The three convex blocks are uniformly arranged in the first or second groove. Correspondingly, there are also three insertion openings. The positions of the insertion openings correspond to the positions of the convex blocks. During use, in rotation, the three convex blocks respectively correspond to the three insertion openings, which reduces the rotation stroke of the objective lens piece rotated by the user. This can facilitate the user to align the convex blocks with the insertion openings. The convex blocks can correspond to the insertion openings in a plurality of positions, making it convenient for the user to assemble the objective lens piece. Meanwhile, there are three locking holes correspondingly, so that the objective lens piece can be locked no matter the three convex blocks correspond to which insertion openings, and the objective lens piece is prevented from being rotated.

In this embodiment, the locking member 30 includes an insertion part 31, a sliding part 32, and an elastic member 33; a sliding space 14 is arranged in the main body 10; the sliding part 32 slides in the sliding space 14; the insertion part 31 is arranged at one end of the sliding part 32 and is located in the first groove 13; the elastic member 33 is abutted to the other end of the sliding part 32; and when the objective lens piece 20 is rotated to the mounting position, the elastic member 33 pushes the sliding part 32 to insert the insertion part 31 into the locking hole 201. By means of the arrangement of the above structure, during use, when the objective lens piece is rotated to the insertion position, the convex block is inserted along the insertion opening. In this case, a bottom wall of the objective lens piece is abutted to the insertion part, and elastic member 33 is compressed to deform. The objective lens piece is rotated to the mounting position. In this case, the locking hole faces the insertion part, and the spring is reset to push the sliding part and the insertion part. The insertion part is inserted into the locking hole to effectively limit the relative rotation between the objective lens piece and a mounting seat. Through the deformation and resetting of the spring, the objective lens piece can be conveniently mounted, and the user does not need to manually adjust the locking member during the mounting of the objective lens piece, making it convenient to use.

In this embodiment, a surface of the main body 10 is provided with a sliding slot 15; the sliding slot 15 is communicated to the sliding space 14; a surface of the sliding part 32 is convexly provided with a push part 34; and the push part 34 is threaded out of the sliding slot 15. By means of the arrangement of the above structure, during use, the push part is threaded out of the sliding slot, so that the user can directly touch the push part, making it convenient for the user to adjust the locking member. During the removal of the objective lens piece, the push part is pushed to separate the insertion part from the locking hole. The objective lens piece is rotated to the insertion position, and the limiting convex block is pulled out along the insertion opening to achieve the removal of the objective lens piece, making it convenient to use and improving the user experience. A finger slot is arranged on an edge of sliding slot 15. The finger slot is configured to allow a finger to be inserted. During use, the finger slot is arranged along the edge of the sliding slot, which can facilitate the user to insert the finger along the finger slot. The push part facilitates use and improves the user experience. The finger slot is not shown in the figure, but the finger slot can be provided.

In this embodiment, the push part 34 is provided with an inclined friction surface 35, and one side of the friction surface 35 close to the insertion part 31 is lower than one side close to the elastic member 33. By means of the arrangement of the above structure, the friction surface can increase a friction between the finger of the user and the push part during use, making it more convenient for the user to adjust the push part. The inclined setting of the friction surface facilitates the user to push the push part downwards, so that the user can better apply a force to separate the insertion part from the locking hole.

In this embodiment, the main body further includes an isolation lens. The isolation lens is hermetically connected into the first groove. By means of the arrangement of the above structure, the isolation lens is hermetically mounted in the first groove, which can effectively protect the structures inside the product. Preferably, the isolation lens is a dustproof and waterproof lens, which can prevent impurities such as dust and water from entering a telescope. This effectively protects components inside the telescope, improves the stability of the product, and prolongs the service life of the product.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

What is claimed is:

1. A sight, wherein the sight comprises:
a main body, wherein the main body comprises a connection end; a first electric connection assembly is arranged on an end surface of the connection end of the main body; a first clamping member is arranged around the first electric connection assembly; and
an objective lens piece, wherein a second electric connection assembly is arranged on one end surface of the objective lens piece; a second clamping member is arranged around the second electric connection assembly; the second clamping member is clamped into the first clamping member to make the objective lens piece detachably connected to the main body; and when the second clamping member is clamped into the first clamping member, the second electric connection assembly is abutted to the first electric connection assembly to make the objective lens piece electrically connected to the main body,
wherein the end surface of the connection end of the main body is provided with a first groove; the first electric connection assembly and the first clamping member are both arranged in the first groove; an end surface of one end of the objective lens piece connected to the main body is provided with a second groove; the second clamping member and the second electric connection assembly are both arranged in the second groove; and when the objective lens piece is mounted on the main body, the second groove wraps around the first groove or the first groove wraps around the second groove.

2. The sight according to claim 1, wherein the first clamping member comprises a clamping port; the clamping port is arranged on a side wall of the first groove; the second clamping member comprises a clamping block and a hollow mounting column; two ends of the mounting column are communicated to each other; the mounting column is arranged in the second groove; the second electric connection assembly is arranged in a through hole of the mounting column; the clamping block is arranged around an outer side of the mounting column; a gap exists between an end socket of the clamping block and a side wall of the second groove; the gap accommodates the side wall of the first groove; when the objective lens piece is mounted on the main body, the side wall of the first groove is mounted in the gap, and the second groove wraps around the first groove; or the first clamping member comprises a clamping block and a hollow mounting column; two ends of the mounting column are communicated to each other; the mounting column is arranged in the first groove; the clamping block is arranged around an outer side of the mounting column; a gap exists between an end socket of the clamping block and the side wall of the first groove; the gap accommodates a side wall of the second groove; and when the objective lens piece is mounted on the main body, the side wall of the second groove is mounted in the gap, and the first groove wraps around the second groove.

3. The sight according to claim 2, wherein the clamping port comprises an insertion opening and a sliding rail; the insertion opening is communicated to the sliding rail; the clamping block is inserted along the insertion opening into the sliding rail and slides in the sliding rail; and the clamping block is abutted to a side wall of the sliding rail.

4. The sight according to claim 1, wherein the sight further comprises a locking member; the locking member is slidably arranged on the main body; one end of the locking member is located in the first groove; the second groove is internally provided with a locking hole; the locking member has a locked position and an unlocked position; when the locking member is in the locked position, the end of the locking member located in the first groove is inserted into the locking hole; and when the locking member is in the unlocked position, the end of the locking member located in the first groove is separated from the locking hole.

5. The sight according to claim 4, wherein the locking member comprises an insertion part, a sliding part, and an elastic member; a sliding space is arranged in the main body; the sliding part slides in the sliding space; the insertion part is arranged at one end of the sliding part and is located in the first groove; the elastic member is abutted to the other end of the sliding part; and when the objective lens piece is rotated to a mounting position, the elastic member pushes the sliding part to insert the insertion part into the locking hole.

6. The sight according to claim 5, wherein a surface of the main body is provided with a sliding slot; the sliding slot is communicated to the sliding space; a surface of the sliding part is convexly provided with a push part; and the push part is threaded out of the sliding slot.

7. The sight according to claim 6, wherein the push part is provided with an inclined friction surface, and one side of the friction surface close to the insertion part is lower than one side close to the elastic member.

8. The sight according to claim 1, wherein the sight is a digital sight; the digital sight further comprises a liquid crystal display device and a first Complementary Metal-Oxide-Semiconductor Transistor (CMOS) image sensing device; the liquid crystal display device and the first CMOS image sensing device are arranged in the main body; and the liquid crystal display device and the first CMOS image sensing device are electrically connected.

9. The sight according to claim 1, wherein the sight is a night vision sight; the night vision sight further comprises a first night vision device; and the first night vision device is arranged in the main body.

10. The sight according to claim 1, wherein the sight is a dual-lens sight; the main body of the dual-lens sight comprises two connection ends; the two connection ends are arranged side by side; the dual-lens sight comprises at least one CMOS image sensing device and at least one night vision device; the at least one night vision device is arranged in one of the connection ends; and the at least one CMOS image sensing device is arranged in the other connection end.

11. A sight, wherein the sight comprises:
a main body, wherein the main body comprises a connection end; a first electric connection assembly is arranged on an end surface of the connection end of the main body; a first clamping member is arranged around the first electric connection assembly; and an objective lens piece, wherein a second electric connection assembly is arranged on one end surface of the objective lens piece; a second clamping member is arranged around the second electric connection assembly; the second clamping member is clamped into the first clamping member to make the objective lens piece detachably connected to the main body; and when the second clamping member is clamped into the first clamping member, the second electric connection assembly is abutted to the first electric connection assembly to make the objective lens piece electrically connected to the main body, wherein the sight is a dual-lens sight; the main body of the dual-lens sight comprises two connection ends; the two connection ends are arranged side by side; the dual-lens sight comprises at least one CMOS image sensing device and at least one night vision device; the at least one night vision device is arranged in one of the connection ends; and the at least one CMOS image sensing device is arranged in the other connection end.

12. A sight, wherein the sight comprises:

a main body, wherein the main body comprises a connection end; a first electric connection assembly is arranged on an end surface of the connection end of the main body; a first clamping member is arranged around the first electric connection assembly; and an objective lens piece, wherein a second electric connection assembly is arranged on one end surface of the objective lens piece; a second clamping member is arranged around the second electric connection assembly; the second clamping member is clamped into the first clamping member to make the objective lens piece detachably connected to the main body; and when the second clamping member is clamped into the first clamping member, the second electric connection assembly is abutted to the first electric connection assembly to make the objective lens piece electrically connected to the main body, wherein the end surface of the connection end of the main body is provided with a first engaging surface; the first electric connection assembly and the first clamping member are both arranged in the first engaging surface; an end surface of one end of the objective lens piece connected to the main body is provided with a second engaging surface; the second clamping member and the second electric connection assembly are both arranged in the second engaging surface; and when the objective lens piece is mounted on the main body, the second engaging surface wraps around the first engaging surface or the first engaging surface wraps around the second engaging surface; and wherein a surface of the main body is provided with a push part configured to push the first engaging surface to be detached from the second engaging surface.

* * * * *